United States Patent [19]

Stemme et al.

[11] 4,220,407
[45] Sep. 2, 1980

[54] CAMERA WITH FILM TRANSPORT MOTOR POWERED BY BATTERY WHICH ALSO CHARGES A FLASH UNIT DURING INTERVALS OF TRANSPORT MOTOR INOPERATIVENESS

[75] Inventors: Otto Stemme; Karl Wagner, both of Munich; Peter Lermann, Narring; Rolf Schröder, Baldham; Peter Utschig, Unterhaching, all of Fed. Rep. of Germany

[73] Assignee: Agfa-Gevaert AG, Leverkusen, Fed. Rep. of Germany

[21] Appl. No.: 20,331

[22] Filed: Mar. 14, 1979

[30] Foreign Application Priority Data

Sep. 25, 1978 [DE] Fed. Rep. of Germany ....... 2841649

[51] Int. Cl.² .................. G03B 1/18; G03B 15/05; G03B 17/18; G03B 17/38
[52] U.S. Cl. ............................ 354/126; 354/145; 354/173; 354/213; 354/60 L; 354/268; 354/289
[58] Field of Search ..................... 354/32-35, 354/60 R, 60 F, 126-128, 145, 171, 173

[56] References Cited

U.S. PATENT DOCUMENTS

| | | | |
|---|---|---|---|
| 3,846,812 | 11/1974 | Biber | 354/145 |
| 4,091,395 | 5/1978 | Kozuki et al. | 354/173 |
| 4,091,400 | 5/1978 | Land | 354/145 X |
| 4,156,565 | 5/1979 | Harrison | 354/60 F X |

*Primary Examiner*—L. T. Hix
*Assistant Examiner*—William B. Perkey
*Attorney, Agent, or Firm*—Michael J. Striker

[57] ABSTRACT

A film transport system includes an electric transport motor. Upon completion of an exposure, the motor is energized to perform a film-transport operation and upon conclusion thereof a perforation-feeler causes the motor to become short-circuited for quick arrest. A flash unit comprises an energy-storing capacitor connected in series with flash-unit batteries. When the film transport motor, which is powered off a motor battery, is motionless or in short-circuited condition, the energy-storing capacitor of the flash unit is permitted to charge both of the flash-unit batteries and the motor battery. When the film transport motor is in operation, the input terminals of the flash unit are conductively shunted together, thereby connecting the flash-unit batteries across the energy-storing capacitor so that the latter may continue to charge off its own batteries but not off the camera batteries. Alternatively, the flash unit does not have separate batteries of its own, and the energy-storing element of the flash unit charges off the motor battery when the film transport motor is at standstill or in short-circuited condition.

6 Claims, 2 Drawing Figures

CAMERA WITH FILM TRANSPORT MOTOR POWERED BY BATTERY WHICH ALSO CHARGES A FLASH UNIT DURING INTERVALS OF TRANSPORT MOTOR INOPERATIVENESS

BACKGROUND OF THE INVENTION

The present invention concerns photographic cameras provided with motor-driven film-transport systems. Typically, such film-transport systems incorporate perforation feelers. When the shutter button is depressed, and the shutter mechanism has both opened and closed, the film-transport motor is energized for a film-transport operation. Then when the perforation feeler senses the perforation in the next-arriving film frame, the transport motor is deenergized, preferably short-circuited as well. The camera's film-transport motor is powered off a motor battery in such systems.

SUMMARY OF THE INVENTION

It is a general object of the present invention to make further use of the motor battery to power additional camera circuitry, in such a manner that the use of the motor battery to power additional circuitry not interfere with proper operation of such circuitry, and likewise such that the powering of the additional circuitry not interfere with proper operation of the film transport motor.

This is achieved in accordance with the present invention by providing switching means operative for alternatively preventing and not preventing the transport motor from drawing energy off the motor battery, and furthermore operative for preventing additional circuitry from drawing energy off the motor battery when the motor is not being thusly prevented, and vice versa not preventing the additional circuitry from drawing energy off the motor battery when the transport motor is being prevented from drawing energy off the motor battery.

The application of the present invention presently believed to represent the most preferred form of utilization of this concept involves electronic flash units, whether of the type built into the camera housing itself or of the attached-on accessory type. Especially when such electronic flash units comprise energy-storing elements, such as inductors, transformers or most especially storage capacitors, the motor battery can be utilized to effect the build-up of operating energy by such energy-storing elements during the time intervals in which the transport motor does not require power from the motor battery, or if the flash unit has batteries of its own, the motor battery can be used to supplement their effect during such time intervals.

In the case of electronic flash units having, for example, energy-storing capacitors, it is important for proper operation of the flash unit that such capacitors draw their requisite energy as a relatively high load current. If this load current were drawn during operation of the film-transport motor, the reliability of film-transport-system operation could too easily be affected.

Preferably, one motor terminal is connected to a first battery terminal and the second motor terminal to the second battery terminal, and when the motor is to be prevented from drawing energy from the motor battery, the second motor terminal is connected to the first to shunt or short-circuit the motor, and one input terminal of the flash unit or other such additional circuitry is then connected to such second motor terminal, the second motor terminal being during this interval no longer connected to the second battery terminal but instead to the first battery terminal. Accordingly, the further circuitry can draw power from the first battery terminal via the second motor terminal.

This switching action can be implemented by simple means, using essentially a single, two-setting changeover switch and a suitable number of connecting conductors.

Particularly when the additional circuitry is an electronic flash circuit, and most especially when the flash circuitry is accommodated in a separate, attached-on accessory unit, the flash unit may typically have flashunit batteries of its own. In that event, the motor battery can be used to supplement the action of the flash-unit batteries during the intervals in which the film transport motor is not being powered off the motor battery.

For this latter instance, it is a further concept of the invention to connect the flash-unit batteries in series with the flash unit's energy-storing element across the input terminals of the flash unit. The flash unit can then be prevented from drawing energy off the motor battery very easily, by shunting the input terminals of the flash unit. This short-circuits the flash unit, in so far as the motor battery is concerned, but within the flash unit itself it serves to connect the flash-unit batteries across the flash unit's energy-storing element. As a result, essentially a single switching action can be used to accomplish all of the following: disconnection of the flash unit from the motor battery and reconnection thereto, and connection of the flash-unit batteries across the flash unit's energy-storing element when the current path which extends from the former to the latter through the motor battery becomes unavailable, i.e., unavailable during the intervals when the transport motor is to be actually powered by the motor battery.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
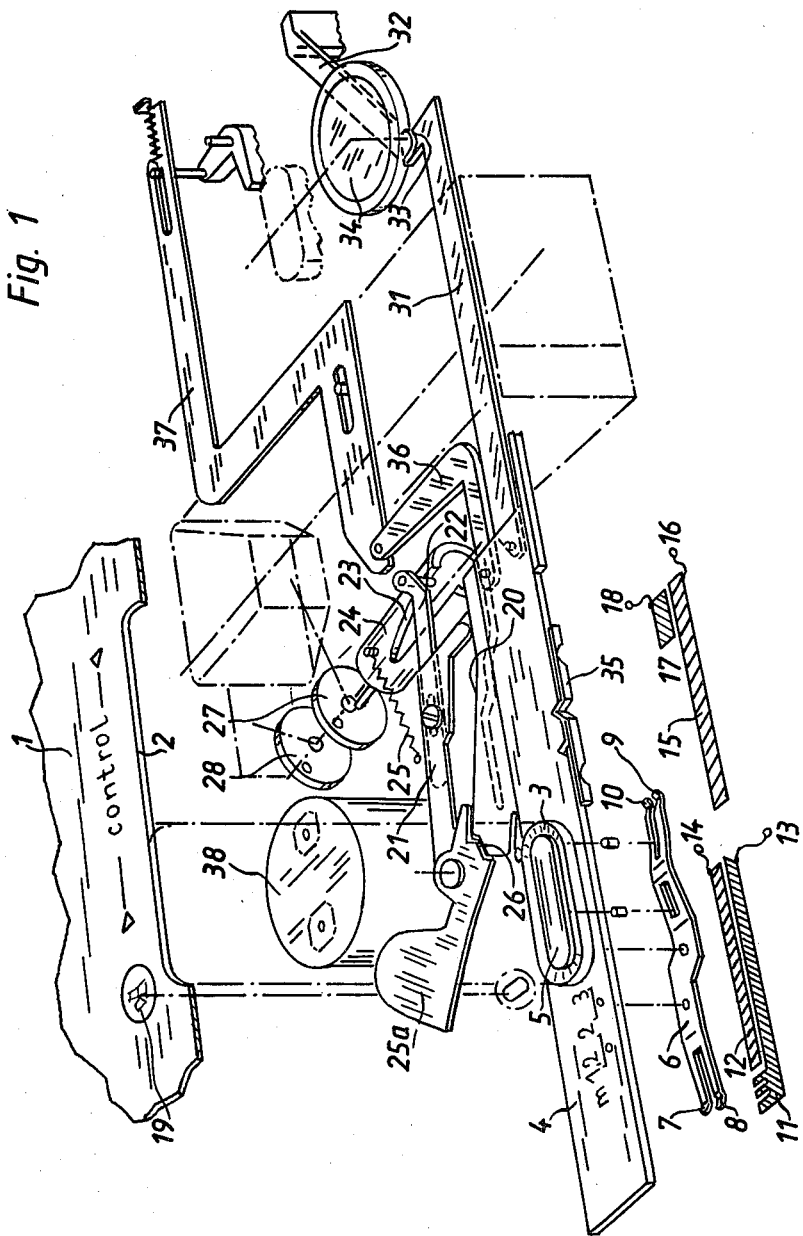
FIG. 1 is a perspective illustration of the mechanical part of a preferred, but merely exemplary embodiment of the present invention.

In FIG. 1, numeral 1 denotes part of the upper face of the housing of a photographic camera. Housing 1 is provided with an elongated cut-out 2, up through which projects a generally oval member 3 manually engaged by the used and carried on a lengthwise slidable elongated slide 4. The manually engaged member 3 is annular and surrounds a pushbutton 5 also of generally oval shape, pushbutton 5 being movable within manually engaged member 3 in the direction perpendicular to the direction in which manually engaged mamber 3 can be shifted.

A generally harness-shaped spring contact member 6 is located below slide 4 and is secured through slide 4 to the pushbutton 5, first so that spring contact member 6 slide as slide 4 slides, and second so that when pushbutton 5 is depressed the right portion of spring contact member 6 likewise be depressed. The resilience of spring contact member 6 is additionally drawn upon to provide a spring biasing force which returns pushbutton 5 to its undepressed position when the user lets go of button 5. Spring contact member 6 is provided with four contact portions 7, 8, 9 and 10.

When slide 3, 4 is in its illustrated leftmost position, the two contact portions 7, 8 are both in conductive engagement with a stationary conductive strip 11. The shape of spring contact member 6 is such that contact portions 7, 8 bear down upon conductive strip 11 without the need for the user to depress pushbutton 5. This leftmost position of slide 3, 4 is its starting or inoperative position. When slide 3, 4 is manually shifted rightwards out of its inoperative position into one of its operative positions, contact portion 7 begins to ride in conductive engagement upon a stationary contact strip 12, as a result of which a conductive connection becomes established between the terminal 13 of contact strip 11 and the terminal 14 of contact strip 12. In a manner described below, the two terminals 13, 14 are employed as an electrical switch.

The contact portions 9 and 10 of spring contact member 6 are located to be engageable with respective ones of two further contact strips 15, 17, but are not normally at an elevation resulting in such engagement and must be pressed down into conductive engagement with such strips by depression of pushbutton 5.

For all operative positions of slide 3, 4, depression of pushbutton 5 results in the establishment of conductive engagement between the terminal 16 of contact strip 15 and the terminal 13 of contact strip 11. In a manner described below, the two terminals 13 and 16 are employed to constitute a further electrical switch.

When slide 3, 4 is in its rightmost end position, depression of pushbutton 5 causes contact portion 10 to conductively engage contact strip 17, thereby establishing an electrical connection between the terminals 16, 18 of the two contact strips 15, 17. The two terminals 16 and 18 are employed in this embodiment to constitute a still further electrical switch. Actually, if slide 3, 4 is in its rightmost end position and pushbutton 5 is depressed, conductive engagement of all four terminals 13, 14, 16, 18 to one another results, in the illustrated exemplary embodiment.

The upper part of camera housing 1 is provided with a small viewing window 19, preferably accommodating a small lens. Located behind the viewing window 19 is the indicium "0", which in a manner described below is visible through window 19 only when the slide 3, 4 is in its leftmost or inoperative position. The appearance of such "0" in window 19 informs the user that the camera's battery is unconnected to the circuits powered by it, in the illustrated exemplary embodiment.

The rear edge (as viewed in FIG. 1) of slide 4 is provided with a camming surface 20 which controls the angular position of a horizontally pivotable follower lever 21. Connected to follower lever 21 is a lever extension 22 at the end of which there depends a pin which tracks along the camming surface 23 of a small cam drum 24 mounted for rotation about a horizontal axis. A tension spring 25 urges the small cam drum 24 counterclockwise, and thereby maintains engagement between lever extension 22 and camming surface 23, and likewise between follower lever 21 and camming surface 20.

At its left end, follower lever 21 carries a covering blade 25a mounted for horizontal swinging movement. A (non-illustrated) biasing spring normally maintains blade 25a in a position covering the indicium "0" so that the latter not be visible through viewing window 19 when slide 3, 4 is in any of its operative positions. When slide 3, 4 is moved to its leftmost, inoperative position, a control projection 26 on its displaces blade 25a to unblocking position, so that the "0" be visible in window 19. Preferably, the upper face of covering blade 25a is colored red or another conspicuous color, so that a glance at the window 19 will inform the user whether the slide 3, 4 is in inoperative position.

Figure 2:
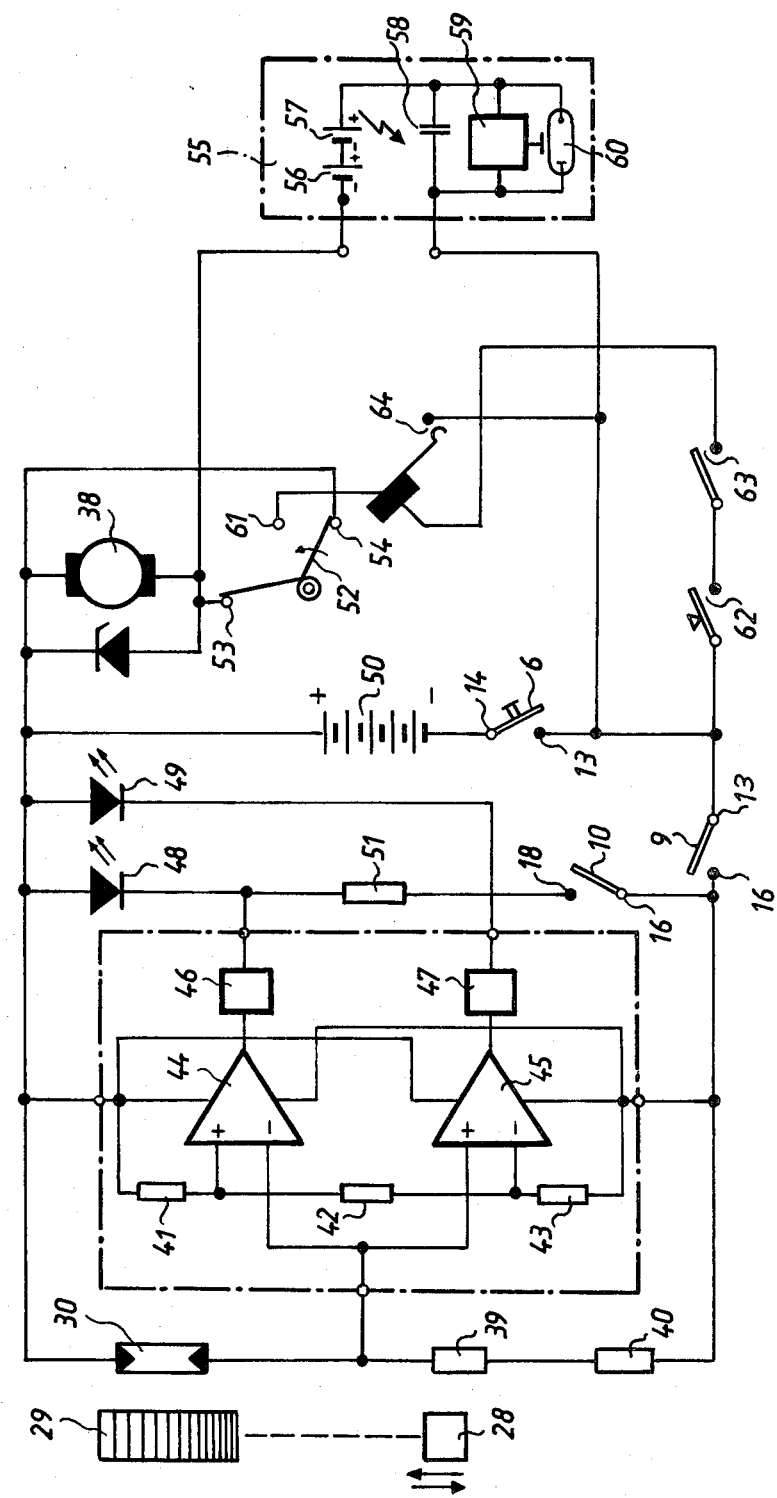
FIG. 2 depicts the electrical circuitry cooperating with the mechanism shown in FIG. 1.

The small cam drum 24 serves to adjust the size of the camera's (non-illustrated) exposure aperture. In particular, rotation of drum 24 effects rotation of two control cams 27, 28. Control cam 27 is coupled, in per se conventional manner, to the camera's exposure-aperture diaphragm and adjusts its size in dependence upon the angular position of drum 24. Control cam 28 is coupled, likewise in conventional manner, to a further, simulator diaphragm located in front of a photosensitive element 30, shown in FIG. 2. In FIG. 2, the simulator aperture 29 has the form of an optical filter of progressively varying transmittance, positioned in front of photosensitive element 30, and operative, under the action of control cam 28, for varying the fraction of incident light actually reaching element 30 in simple correspondence to the size of the exposure aperture established by control cam 27.

Slide 4 is provided at its right end with an extension 31 at the right end of which is a blocking projection 33. Numeral 32 denotes a trigger lever which, when depressed due to depression by the user of an elastic-diaphragm trigger button 34, triggers performance of an exposure. When slide 3, 4 is in its leftmost, inoperative position, blocking projection 33 is located in the path of movement of the trigger lever 32, thereby preventing the triggering of an exposure. As slide 3, 4 is shifted rightwards out of its leftmost, inoperative position, it sets the camera's exposure aperture and also the aperture simulator 29 to progressively smaller sizes, starting from maximum aperture. A first part of the range of movement of slide 3, 4 is associated with flash-lamp exposures. For example, there may be two distinct flash-lamp-exposure settings, established by a springy detent 35 engaging notches on the side of the slide 4 and used only when a lamp exposure is to be made. In the illustrated embodiment, there is pin-and-slot coupled to slide 4 a lever or link 36 which is in turn articulately coupled to the left end of an angled slider 37 operative, when slide 4 has been moved to one of its flash-lamp-exposure settings, for performing functions attendant to flash-lamp exposures. Chief among these functions is that slide 36 close a switch connected in the current path of the camera's flash unit, e.g., a power-connect switch connected between the circuitry of the flash unit and the camera's battery or the flash unit's own battery if it comes as a removable attachment provided with a battery of its own. Slide 36 may also implement various other flash-related functions, such as modifying the duration of the flash, e.g., by modifying the impedance in the current path of the flash unit's timer, etc.

Numeral 38 denotes an electric motor used to transport film and to rewind or reset the camera's shutter mechanism, after the shutter has been triggered to perform an exposure.

In the exemplary circuit depicted in FIG. 2, the photoresistor 30 is connected in series with two resistors 39, 40 to form a light-dependent voltage divider, having a tap intermediate elements 30 and 39. A second or reference voltage divider is constituted by resistors 41, 42 and 43. The voltage-divider tap intermediate photoresistor 30 and resistor 39 is connected to the inverting input of an operational amplifier 44 and to the non-inverting input of an operational amplifier 45. The voltage-divider tap between the resistors 41 and 42 is connected to the non-inverting input of operational amplifier 44, and the voltage-divider tap between resistors 42 and 43 is connected to the inverting input of operational amplifier 45. Connected to the outputs of the two operational amplifiers 44, 45 are the inputs of respective threshold stages 46, 47, whose outputs are connected to the cathodes of respective light-emitting diodes 48, 49, the anodes of these diodes being connected to the positive terminal of the camera's battery 50. When the size of the camera's exposure aperture is too small, one of the two LED's 48, 49 lights up, and when too large the other LED lights up, to indicate to the user the direction in which he should manually shift slide 3, 4 to establish the correct exposure-aperture size. To this end, the two LED's 48, 49 can be configured, or located behind apertures configured, as arrows and be located or visible in the camers's viewfinder, to inform the user as directly as possible of the sense of the exposure-aperture error.

The negative terminal of the camera's motor battery 50 is permanently connected to terminal 14 of contact strip 12. When slide 3, 4 is shifted rightwards out of inoperative position, it conductively connects terminal 14 to terminal 13 of contact strip 11, the spring contact member 6 in this respect acting as the main power-connect switch for the camera's control circuitry.

Provided that manual slide 3, 4 is not in its leftmost, inoperative setting, depression of pushbutton 5 will at least cause contact portion 9 of spring contact member 6 to electrically engage contact strip 15, thereby electrically connecting strip terminal 16 to strip terminal 13. As shown at 9 in FIG. 2, this has the result that the illustrated light-responsive circuitry located to the left of battery 50 becomes operatively connected to the battery. Thus, depression of pushbutton 5 with the slide 3, 4 not in inoperative position, activates the light-responsive circuitry, and one or the other of the two LED's 48, 49 then lights up to indicate the direction in which slide 3, 4 ought to be moved to correct the aperture-size error, and if the aperture error is zero both LED's 48, 49 light up (or alternatively, neither of them).

The user can perform a test of battery condition by first shifting slide 3, 4 all the way to its rightmost end position and then depressing pushbutton 5, whereupon contact portion 10 of spring contact member 6 will engage contact strip 17 as contact portion 9 engages contact strip 15, thereby connecting together the two strip terminals 16, 18. As shown at 10 in FIG. 2, this action serves to connect, directly across battery 50, the series connection of one LED 48 and a test resistor 51. The resistance of test resistor 51 is selected high enough so that the voltage across and current flowing through LED 48 will be sufficient to light up LED 48, only if the battery 50 has enough remaining capacity to pefform the functions to which the test relates; principally, such test would, for example, serve to ascertain whether the remaining capacity of battery 50, although perhaps sufficient for the scene-light indicator circuitry, is furthermore sufficient for energization of motor 38, motor 38 serving to transport film and rewind or reset the camera's shutter mechanism after each exposure.

For the purposes of explanation, motor 38 is assumed to be a film-transport and shutter-resetting motor, e.g., such as forms part of the film-transport and camera-control mechanism disclosed in commonly owned, copending application Ser. No. 939,374 filed Sept. 5, 1978. When the user depresses the camera release button 34, such mechanism becomes triggered, an elongated control rod is spring-driven in a first direction tripping the shutter in the process, whereupon the elongated control rod becomes coupled to and driven by the motor in the opposite second direction back to its starting position, at which point it decouples from the motor, the rod rewinding the shutter mechanism in the course of its second-direction stroke. Reference may be had to the application just identified for details of such a mechanism. In the present instance, and for explanatory purposes only, it is only the electrical switches cooperating with such mechanism which are of interest, and only these are shown in FIG. 2.

Numeral 62 denotes a switch which closes when the user depresses trigger button 34, and stays closed only so long as the user maintains trigger button 34 depressed. Closing of switch 62 does not, in itself, energize transport motor 38, but instead merely prepares the motor-energization circuitry for energization.

Numeral 63 denotes a switch which closes when, subsequent to the pressing down of trigger button 34, the camera's shutter mechanism has performed both an opening and then a closing movement; i.e., switch 63 closes after the camera's shutter mechanism has fully converted from its triggerable set state to its unset state in which it must be reset before it again becomes triggerable.

Numeral 64 denotes a centrifugal switch which closes when motor 38 reaches full operating speed. When centrifugal switch 64 is open, a stationary contact 64 is connectable to the negative terminal of battery 50 only via switches 62 and 63, so that with motor 38 at a standstill or at a speed lower than full operating speed, motor 38 can be energized only if both of switches 62 and 63 are closed. When centrifugal switch 64 is closed, stationary contact 61 is connected to the negative terminal of motor battery 50 directly, i.e., not through the intermediary of switches 62 and 63, so that one or both of these latter two switches can open without discontinuing motor operation.

Numeral 52 denotes a changeover switch having two settings, in one of which motor 38 is short-circuited, and in the other of which the lower terminal of motor 38 is connectable via contact 61 to the negative terminal of battery 50. Here, the changeover switch 52 is depicted as a two-legged torsion-spring contact, the left leg of which permanently bears against a stationary contact 53, and the left leg of which engages either a stationary contact 54 (to short-circuit motor 38) or else the aforementioned contact 61 (to connect motor 38 to the negative battery terminal). In particular, changeover switch 52 begins to engage contact 61, to enable motor 38 to be energized after the camera's shutter has converted from set to unset state and needs to be reset. After the motor 38 has reset the camera's shutter mechanism, it continues to operate until the completion of a one-frame film-transport movement, and at the end of such movement a perforation feeler typically enters into the perforation of the next film frame, in response to which changeover switch 52 moves back into engagement with contact 54, thereby disconnecting motor 38 from power and furthermore short-circuiting it for the sake of a quick braking action.

Numeral 55 denotes the flash unit of the camera. Flash unit 55 comprises two batteries 56, 57 of its own, a storage capacitor 58, and a conventional control circuit 59 for firing and possibly also quenching a flash tube 60. Storage capacitor 58 charges off batteries 56, 57 irrespective of the setting of changeover switch 52. Capacitor 58 additionally charges off of motor battery 50, but only when changeover switch 52 is in the setting thereof short-circuiting motor 38. When changeover switch 52 is in its illustrated setting, connecting the lower terminal of motor 38 to the negative terminal of camera battery 50, capacitor 58 is prevented from charging off of battery 50, so that the load current drawn by flash unit 55 at such time not interfere with proper operation of motor 38, and vice versa.

In particular, when motor 38 is running during film-transport and/or shutter-resetting operations, the upper input terminal of flash unit 55 is connected to the negative terminal of battery 50, via contact 53, switch member 52 and contact 61. The lower input terminal of flash unit 55 is likewise connected to the negative terminal of battery 50, via terminals 13 and 14. When both the upper and the lower input terminal of flash unit 55 connected to the negative terminal of battery 50, the battery 50 is not connected across the input terminals of the flash unit, and accordingly the flash unit cannot draw current from battery 50. At the same time, however, both input terminals of flash unit 55 are conductively connected together, i.e., both being connected to the negative terminal of battery 50, so that storage capacitor 58 is connected directly across flash-unit batteries 56, 57 and can accordingly be charged off the latter.

Although, as illustrated, the flash-unit batteries 56, 57 become directly connected across storage capacitor 58 when motor 38 is in short-circuited state, it will be understood that the flash unit 55 might be of the type in which a voltage source is not directly connected across a storage capacitor but instead across the input terminals of a D.C.-D.C. converter having an output connected across the storage capacitor, in which case the short-circuited state of motor 38 would be associated with such a mode of connection. Likewise, it will be understood that the flash unit 55 may not be provided with batteries 56, 57 of its own, especially if unit 55 is a built-in unit and not a removable attachment; in that case, flash unit 55 would draw current exclusively when motor 38 is not running. Especially in the case of a built-in flash-lamp unit, the slide 37 of FIG. 1, as already stated, is advantageously employed to close an electrical switch, e.g., in the operating-voltage line of control stage 59, to ready the flash unit for operation when manual slide 3, 4 is shifted to one of its flash-exposure settings.

In the illustrated, exemplary embodiment, the shifted position of manual slide 3, 4 rather directly adjusts exposure-aperture size, via the small cam drum 24. It will be understood, however, that the position of manual slide 3, 4 could also be employed to adjust the subject-distance setting of the camera's exposure objective. Likewise, manual slide 3, 4 could also be used to adjust exposure duration, by varying the impedance of the time-constant stage of an exposure-duration control circuit, either directly in the electrical sense or indirectly in the case of photoelementcontrolled timing circuits by modifying the amount of light incident upon the timing circuit's photoelement. The illustrated uses of manual slide 3, 4, although presently preferred, will be understood to be examples of such uses.

It will be understood that each of the elements described above, or two or more together, may also find a useful application in other types of circuits and constructions, differing from the types described above.

While the invention has been illustrated and described as embodied in the combination of a commonly powered film transport motor and electronic flash unit, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a photographic camera of the type provided with an electric film transport motor, battery terminals for electrical connection to a camera battery and flash-unit terminals for electrical connection to an electronic flash unit, a novel energization-control arrangement which comprises switching means operative for alternatively preventing and not preventing the film transport motor from drawing energy off the battery terminals, operative when the motor is not thusly prevented for furthermore preventing the flash-unit terminals from drawing energy off the battery terminals, but not preventing the flash-unit terminals from drawing energy off the battery terminals when the film transport motor is being prevented from drawing energy off the battery terminals; an electronic flash unit having input terminals connected to respective ones of the flash-unit terminals, the flash unit including an energy-storing element which, when permitted to do so, draws energy from the battery terminals to build up stored energy in preparation for an electronic flash, the switch means preventing the energy-storing element from building up stored energy drawn off the battery terminals when the transport motor is not being prevented from drawing energy off the battery terminals, but the switch means not preventing the energy-storing element from building up stored energy drawn off the battery terminals when the transport motor is being prevented from drawing energy off the battery terminals; the flash unit furthermore including a flash-unit battery connected in series with the energy-storing element across the flash-unit terminals, the switching means comprising means operative when the film transport motor is being prevented from drawing energy off said battery terminals for connecting the flash-unit battery into series connection with a battery connected to the battery terminals.

2. In a photographic camera as defined in claim 1, the switching means including means operative for preventing the flash unit from drawing energy off the battery terminals by shunting the flash-unit terminals and thereby also connecting the flash-unit battery across the energy-storing element of the flash unit.

3. In a photographic camera as defined in claim 1, the switching means comprising a changeover switch having a first setting in which it connects the transport motor across the battery terminals and simultaneously precludes energy-drawing connection of the flash-unit terminals across the battery terminals, and having a second setting in which it short-curcuits the transport motor and connects the flash-unit terminals across the battery terminals for the drawing of energy by the former off the latter.

4. In a photographic camera of the type provided with an electric film transport device including an electric motor, battery terminals for electrical connection to a camera battery, flash-unit terminals for electrical connection to an electrical energy-storing element of a flash-unit, an energization-control arrangement which comprises: a two-position switch having a switching member actuated by said film transport device into a first switching position in which said switching member establishes a short-circuit across said motor and simultaneously disconnects said motor from said battery terminals while connecting said flash-unit terminals via said short-circuit in series with said battery terminals; and into a second switching position in which said switching member connects said motor to said battery terminals while establishing a short-circuit across said flash-unit terminals and simultaneously disconnecting said flash-unit terminals from said battery terminals.

5. A combination as defined in claim 4 further including additional battery terminals arranged in said flash-unit between one of said flash-unit terminals and said energy-storing element for electrical connection to a flash-unit battery.

6. A combination as defined in claim 4 wherein said film transport device includes a film perforation feeler and a shutter setting mechanism controlled by said motor, and said two-position switch being actuated by said perforation feeler.

* * * * *